United States Patent
Goldberg et al.

(10) Patent No.: US 9,836,595 B1
(45) Date of Patent: Dec. 5, 2017

(54) COGNITIVE PASSWORD PATTERN CHECKER TO ENFORCE STRONGER, UNREPEATABLE PASSWORDS

(71) Applicant: INTERNATIONAL BUSINESS MACHINES CORPORATION, Armonk, NY (US)

(72) Inventors: Itzhack Goldberg, Hadera (IL); Harry R. McGregor, Tucson, AZ (US); Christopher B. Moore, Vail, AZ (US); Shawn P. Mullen, Buda, TX (US); Neil Sondhi, Pilisborosjeno (HU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/412,081

(22) Filed: Jan. 23, 2017

Related U.S. Application Data

(63) Continuation of application No. 15/284,893, filed on Oct. 4, 2016.

(51) Int. Cl.
  *G06F 21/46* (2013.01)
  *H04L 29/06* (2006.01)
(52) U.S. Cl.
  CPC .......... *G06F 21/46* (2013.01); *H04L 63/083* (2013.01)
(58) Field of Classification Search
  CPC ............................... G06F 21/46; H04L 63/083
  See application file for complete search history.

(56) References Cited

U.S. PATENT DOCUMENTS

| | | | |
|---|---|---|---|
| 4,581,755 A | 4/1986 | Sakoe | |
| 4,998,285 A * | 3/1991 | Suzuki | G06K 9/32 382/171 |
| 5,063,604 A * | 11/1991 | Weiman | G06K 9/4633 382/170 |

(Continued)

FOREIGN PATENT DOCUMENTS

WO    2009155254 A2    12/2009

OTHER PUBLICATIONS

Ballard, D. H.; "Generalizing the Hough Transform to Detect Arbitrary Shapes", 1981, Pattern Recognition, vol. 13, No. 2, pp. 111-122.*

(Continued)

*Primary Examiner* — Matthew Smithers
(74) *Attorney, Agent, or Firm* — Michael O'Keefe

(57) ABSTRACT

A method for determining a password strength is provided. The method may include receiving a user-entered password. The method may also include identifying a keyboard layout type associated with a keyboard utilized to enter the received user-entered password. The method may further include mapping each character within a plurality of characters in the received user-entered password to a corresponding location on a grid associated with the identified keyboard layout type. The method may also include determining a coordinate sequence associated with the received user-entered password based on the mapped plurality of characters. The method may further include applying a pattern recognition algorithm to the determined coordinate sequence. The method may also include determining a password strength based on the applied pattern recognition algorithm.

1 Claim, 6 Drawing Sheets

(56) References Cited

U.S. PATENT DOCUMENTS

| | | | | |
|---|---|---|---|---|
| 5,220,621 | A * | 6/1993 | Saitoh | G06K 9/6205 382/200 |
| 6,246,769 | B1 | 6/2001 | Kohut | |
| 7,367,053 | B2 * | 4/2008 | Sanai | G06F 21/46 713/183 |
| 7,644,433 | B2 | 1/2010 | Mizrah | |
| 7,992,005 | B2 | 8/2011 | Torres et al. | |
| 8,024,775 | B2 | 9/2011 | Xu et al. | |
| 8,108,932 | B2 * | 1/2012 | Himberger | G06F 21/46 713/183 |
| 8,150,211 | B2 * | 4/2012 | Li | G06K 9/4633 358/3.26 |
| 8,387,122 | B2 * | 2/2013 | Toomim | G06F 21/6218 713/183 |
| 8,554,177 | B2 | 10/2013 | Yeo | |
| 8,973,116 | B2 * | 3/2015 | Wheeler | G06F 21/46 726/6 |
| 9,111,073 | B1 * | 8/2015 | Jiang | G06F 21/36 |
| 9,230,095 | B1 | 1/2016 | Leininger et al. | |
| 9,438,419 | B1 | 9/2016 | Aggarwal et al. | |
| 2003/0140258 | A1 * | 7/2003 | Nelson | G06F 21/46 726/6 |
| 2009/0133120 | A1 * | 5/2009 | Cannizzaro | G06F 21/46 726/18 |
| 2009/0252420 | A1 * | 10/2009 | Sakurai | G06K 9/4633 382/202 |
| 2013/0139248 | A1 * | 5/2013 | Rhee | G06F 3/0346 726/19 |
| 2014/0181956 | A1 * | 6/2014 | Ahn | G06F 21/46 726/18 |
| 2015/0143509 | A1 * | 5/2015 | Selander | G06F 21/46 726/18 |
| 2015/0220715 | A1 * | 8/2015 | Kim | G06F 21/32 726/18 |

OTHER PUBLICATIONS

Cheng et al., "Recognition of Handwritten Chinese Characters by Modified Hough Transform Techniques", Apr. 1989, IEEE Transactions on Pattern Analysis and Machine Intelligence, vol. 11, No. 4, pp. 429-439.*

Mell et al., "The NIST Definition of Cloud Computing," National Institute of Standards and Technology, Sep. 2011, p. 1-3, Special Publication 800-145.

WP Engine, "Unmasked: What 10 million passwords reveal about the people who choose them," An Analysis of 10 Million Passwords, p. 1-16, http://wpengine.com/unmasked/, Accessed on Sep. 26, 2016.

Goldberg et al., Pending U.S. Appl. No. 15/284,893, filed Oct. 4, 2016, titled "Cognitive Password Pattern Checker to Enforce Stronger, Unrepeatable Passwords," pp. 1-33.

IBM: List of IBM Patents or Patent Applications Treated as Related (Appendix P), Jan. 24, 2017, pp. 1-2.

* cited by examiner

COGNITIVE PASSWORD PATTERN CHECKER TO ENFORCE STRONGER, UNREPEATABLE PASSWORDS

BACKGROUND

The present invention relates, generally, to the field of computing, and more particularly to password checkers.

Many programs and devices utilized in everyday life require an individualized account in order for a user to gain access to the services provided by the particular program or device. A unique username and a user-generated password may be associated with a user account. In order to ensure high password strength to avoid unauthorized access to user accounts, some programs and devices may incorporate parameters surrounding a user-generated password, such as password lengths or required characters. Password checkers may be utilized to determine password strength by analyzing the generated password using statistical algorithms, such as Hough transforms and Markov chains.

SUMMARY

According to one embodiment, a method for determining a password strength is provided. The method may include receiving a user-entered password. The method may also include identifying a keyboard layout type associated with a keyboard utilized to enter the received user-entered password. The method may further include mapping each character within a plurality of characters in the received user-entered password to a corresponding location on a grid associated with the identified keyboard layout type. The method may also include determining a coordinate sequence associated with the received user-entered password based on the mapped plurality of characters. The method may further include applying a pattern recognition algorithm to the determined coordinate sequence. The method may also include determining a password strength based on the applied pattern recognition algorithm.

According to another embodiment, a computer system for determining a password strength is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving a user-entered password. The method may also include identifying a keyboard layout type associated with a keyboard utilized to enter the received user-entered password. The method may further include mapping each character within a plurality of characters in the received user-entered password to a corresponding location on a grid associated with the identified keyboard layout type. The method may also include determining a coordinate sequence associated with the received user-entered password based on the mapped plurality of characters. The method may further include applying a pattern recognition algorithm to the determined coordinate sequence. The method may also include determining a password strength based on the applied pattern recognition algorithm.

According to yet another embodiment, a computer program product for determining a password strength is provided. The computer program product may include one or more computer-readable storage devices and program instructions stored on at least one of the one or more tangible storage devices, the program instructions executable by a processor. The computer program product may include program instructions to receive a user-entered password. The computer program product may also include program instructions to identify a keyboard layout type associated with a keyboard utilized to enter the received user-entered password. The computer program product may further include program instructions to map each character within a plurality of characters in the received user-entered password to a corresponding location on a grid associated with the identified keyboard layout type. The computer program product may also include program instructions to determine a coordinate sequence associated with the received user-entered password based on the mapped plurality of characters. The computer program product may further include program instructions to apply a pattern recognition algorithm to the determined coordinate sequence. The computer program product may also include program instructions to determine a password strength based on the applied pattern recognition algorithm.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
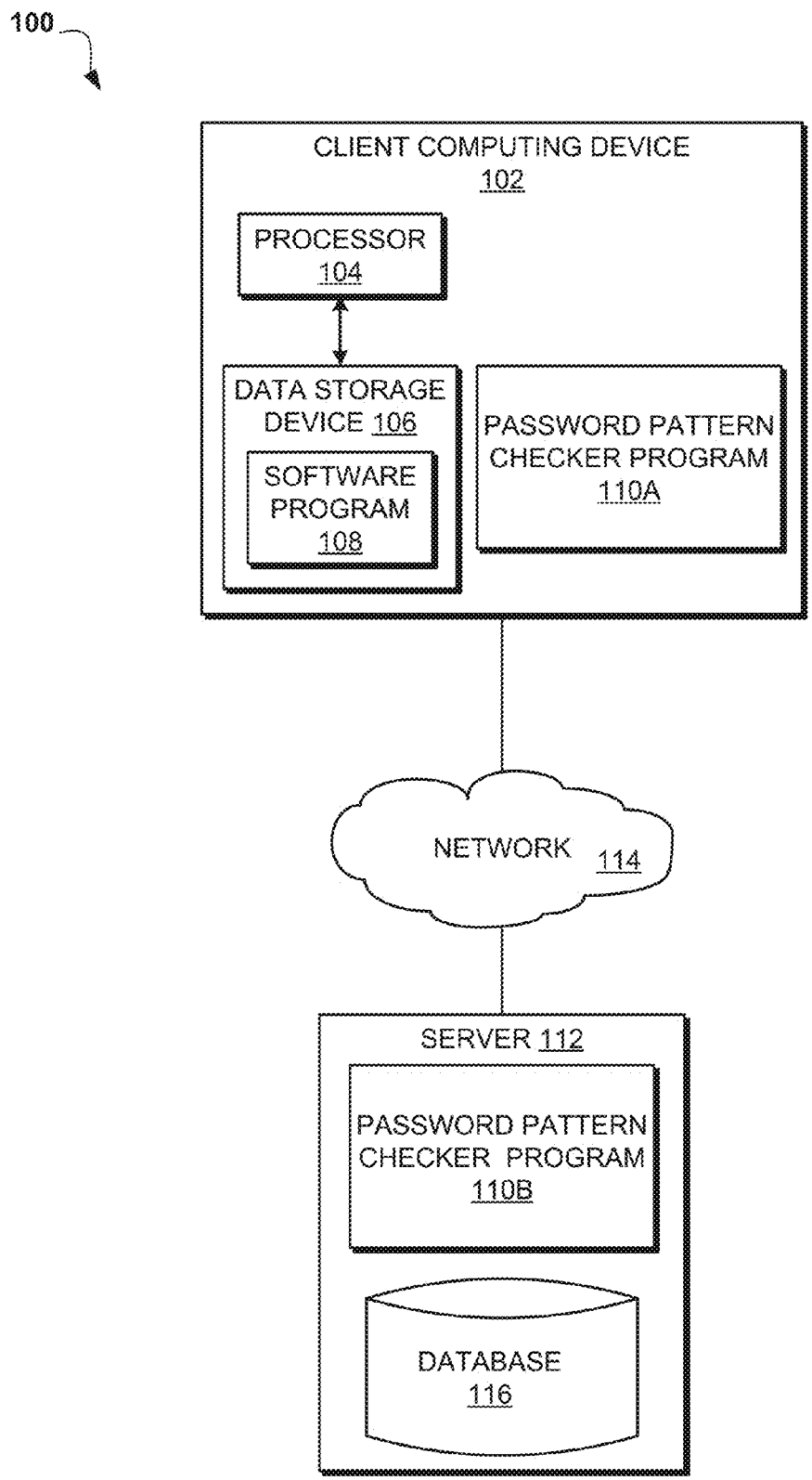
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention are related to the field of computing, and more particularly to password checkers. The following described exemplary embodiments provide a system, method, and program product to, among other things, analyze the pattern of pressed keyboard keys when a password is entered to identify weak patterns that may compromise password integrity. Therefore, the present embodiment has the capacity to improve the technical field of password checkers by utilizing analytics to determine password strength based on the patterns of typed keys on a physical or digital keyboard rather than simply common letter pairings (e.g. predictable existing words used as a password) and efficiently detecting keyboard pattern repeats in a user's password history.

As previously described, many programs and devices utilized in everyday life require an individualized account in order for a user to gain access to the services provided by the particular program or device. A unique username and a user-generated password may be associated with a user account. In order to ensure high password strength to avoid unauthorized access to user accounts, some programs and devices may incorporate parameters surrounding a user-generated password, such as password lengths or required characters. Password checkers may be utilized to determine password strength by analyzing the generated password using statistical algorithms, such as Hough transforms and Markov chains.

Some user-generated passwords may appear, at first glance, to be a random alphanumeric sequence. For example, the password "qaz2wsx" may appear to be a fairly random password understood only by the user generating the password. However, the password "qaz2wsx" is a very common password since the character keys comprising the password are each juxtaposed on a standard QWERTY keyboard. Since using a keyboard pattern as a password may be predictable, using such patterns may yield weak user-generated passwords. However, many typical password checkers may be incapable of analyzing keyboard patterns when determining password strength. As such, it may be advantageous to, among other things, implement a system that compares keyboard layouts to the specific pressed keys in a user-generated password to determine password strength.

According to one embodiment, an image of a user keyboard may be overlaid by the keys pressed when a user enters a password. The overlaid pattern of pressed keys may be analyzed to recognize a key pattern that may compromise the password strength. Additionally, the pattern of pressed keys may be compared to previous analyzed patterns stored within a database to determine similarities between previous user-generated passwords. For example, the password "3edc4rfv" is the same as the password "2wsx3edc" shifted one column to the right.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to determine password strength by analyzing pressed key patterns on a keyboard.

Referring to FIG. 1, an exemplary networked computer environment 100 is depicted, according to at least one embodiment. The networked computer environment 100 may include a client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

The client computing device 102 may include a processor 104 and a data storage device 106 that is enabled to host and run a software program 108 and a password pattern checker program 110A and communicate with the server 112 via the communication network 114, in accordance with one embodiment of the invention. The client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a password pattern checker program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the password pattern checker program 110A, 110B may be a program capable of analyzing the keys typed by a user when entering a password to determine if a predictable pattern exists. The password pattern checker program 110A, 110B may compare a proposed user password with previous user passwords to determine if a similar pattern between the two passwords exists. As indicated in the earlier example, the proposed user password "3edc4rfv" uses the same pattern of keys as the previous user password "2wsx3edc" however the password "3edc4rfv" shifts the pressed keys one column to the right on a QWERTY keyboard. Therefore, the password pattern checker program 110A, 110B may recognize a pattern exists between the two user-generated passwords and determine the proposed password "3edc4rfv" is not a strong password in light of the previous password "2wsx3edc." Additionally, the password pattern checker program 110A, 110B may interact with the database 116, which may be capable of storing the previous user-entered passwords and keyboard layout configuration information, such as images of keyboard layouts. The password pattern checker method is explained in further detail below with respect to FIG. 2.

Figure 2:
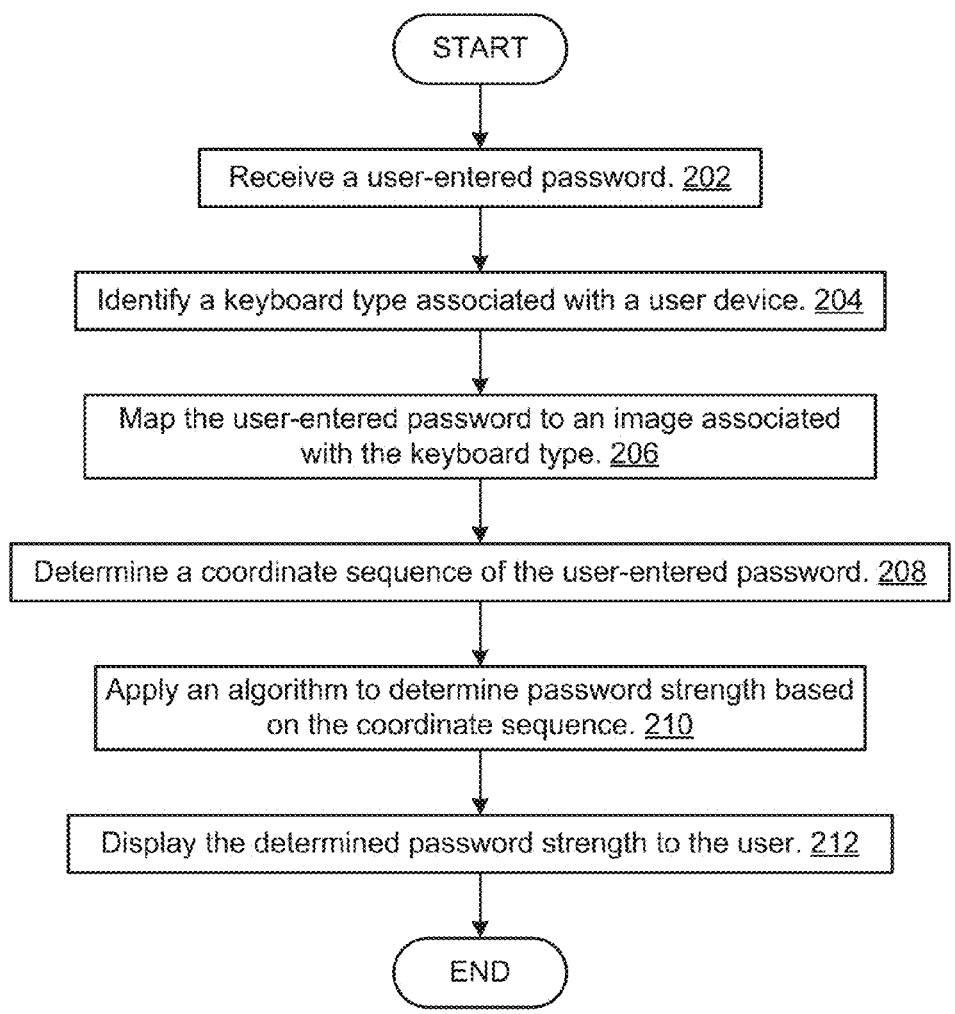
FIG. 2 is an operational flowchart illustrating a password pattern checker process according to at least one embodiment.

Referring now to FIG. 2, an operational flowchart illustrating a password pattern checker process 200 is depicted, according to at least one embodiment. At 202, the password pattern checker program 110A, 110B receives a proposed user-entered password. The password pattern checker program 110A, 110B may receive the password when the user interacts (e.g. types, traces, speaks, etc.) with a user device, such as client computing device 102, using an input device, such as a physical keyboard or a digital keyboard displayed through a graphical user interface. The user-entered password may be any series of characters available on any one of a variety of keyboard layout types. For example, a QWERTY keyboard may be used to enter the alphanumeric password "bhu8ikj."

Then, at 204, the password pattern checker program 110A, 110B identifies a keyboard type associated with a user device. As previously described, the password pattern checker program 110A, 110B may be utilized with a variety of keyboard layout types, such as QWERTY, AZERTY, QWERTZ, DVORAK, COLEMAK, MALTRON, and JCUKEN. Since different keyboard types have different layouts, the password pattern checker program 110A, 110B may identify the type of keyboard used by the user when entering a password to determine whether the password is associated with a specific pattern on the utilized keyboard. For example, the password "cde3vfr4" is typed with keys in two juxtaposed columns on a QWERTY keyboard but are seemingly unrelated on a MALTRON keyboard.

Next, at 206, the password pattern checker program 110A, 110B maps the user-entered password to an image associated with the keyboard type. Using the identified keyboard type, the password pattern checker program 110A, 110B may map each character of the password to the corresponding key on the keyboard layout. In at least one embodiment, an image of the keyboard layout of the identified keyboard type may be overlaid with icons, such as dots, representing a user-pressed key in the password. For example, in the previously described password "cde3vfr4," the keys representing the characters "c," "d," "e," "3," "v," "f," "r," and "4" on a keyboard image may each have a dot displayed on them to correspond to each character in the password "cde3vfr4." The image associated with each keyboard type may be stored within a data repository, such as database 116. If a password utilizes the same key more than once, the icon used to represent the pressed key may be displayed using a different icon or color. For example, if a red dot was used by the password pattern checker program 110A, 110B to illustrate a key was pressed once, the password pattern checker program 110A, 110B may display a blue dot to illustrate a key was pressed twice and a green dot to illustrate a key was pressed three times. In another example, a circle shape may be used to indicate a key was pressed once in a password and a square shape may be used to indicate a key was pressed twice. In situations where a character appears more than once in the same keyboard layout, such as the numeric keys on a QWERTY keyboard, the password pattern checker program 110A, 110B may map a pressed key to each instance of the key within the keyboard layout.

Then, at 208, the password pattern checker program 110A, 110B determines a coordinate sequence of the user-entered password. Once the physical location of each pressed key within the password is mapped, the password pattern checker program 110A, 110B may determine a coordinate location for each pressed key. The password pattern checker program 110A, 110B may determine the coordinates for each pressed key based on an x-y coordinate graph where the origin of the graph is located in the lower left corner of the keyboard layout. For example, if a QWERTY keyboard is used to enter a user password, the origin may be located to the lower left of the "Ctrl" key. The location of each key may be calculated based on a number of measurement standards, such as inches, centimeters, or millimeters. Additionally, the password pattern checker program 110A, 110B may create a grid over the keyboard layout to identify the location of each pressed key. For example, in a QWERTY keyboard layout, the "s" key may have grid coordinates of [3, 3] since the "s" key is three keys from the left end of the keyboard and three keys from the bottom of the keyboard.

In another embodiment, the location of each key on the keyboard layout may be pre-calculated by the password pattern checker program 110A, 110B and stored within a data repository, such as database 116. Once a coordinate location is calculated for each pressed key, the password pattern checker program 110A, 110B may string together the individual coordinates to create a series of coordinates associated with the sequence of characters in the password. For example, in the password "cde3vfr4," the coordinates for the "c" key are first, then the coordinates for the "d" key, and so on through the coordinates for the "4" key.

In yet another embodiment, if the keyboard layout of the identified keyboard has more than one instance of a pressed key, such as the numeric keys on a QWERTY keyboard, the password pattern checker program 110A, 110B may create multiple coordinate sequences to serve each potential key press pattern. For example, the password "cde3vfr4" may appear in both the alpha and numeric areas of a QWERTY keyboard. Therefore, multiple coordinate sequences may be created so multiple press patterns may be analyzed by the password pattern checker program 110A, 110B.

Next, at 210, the password pattern checker program 110A, 110B applies a pattern recognition algorithm to determine password strength based on the coordinate sequence. Once the x-y coordinate sequence is determined, the password pattern checker program 110A, 110B may apply a known pattern recognition algorithm, such as Hough transforms or a Markov chain, to determine the strength of the user-entered password. Additionally, the password pattern checker program 110A, 110B may compare previous passwords stored within a data repository, such as database 116, to identify patterns between the proposed user password and the previous user passwords that may compromise the password strength. For example, the password pattern checker program 110A, 110B may recognize that the proposed user password "1 qaz6YHN" may be a reused key pattern of the previous password "2wsx7UJM," since each password is the same pattern but shifted one column to the left on a QWERTY keyboard.

In at least one embodiment, the algorithms utilized by the password pattern checker program 110A, 110B may consider current or previous passwords associated with other accounts when determining password strength in order to recognize patterns between a current password and a previous password. For example, if the password "cde3vfr4" is used for two different accounts, the password pattern checker program 110A, 110B may determine the password is weak. Similarly, if a previous password for a user account is "xsw2cde3," then the password pattern checker program 110A, 110B may determine the password "cde3vfr4" is weak since the password "cde3vfr4" only shifts the password "xsw2cde3" one column to the right on a QWERTY keyboard.

Next, at 212, the password pattern checker program 110A, 110B displays the determined password strength to the user. The determined password strength may be displayed to the user through a graphical user interface on a display screen of the user device, such as client computing device 102. Additionally, the determined password strength may be a word, color, number, or other indication of password strength. For example, if the password pattern checker program 110A, 110B determines a user-entered password is strong, the word "strong" may be displayed on a graphical user interface. Similarly, if a 1-to-10 numeric scale is used to determine password strength where the number "10" is associated with a very strong password, the number "10" may be displayed on the user device display screen when the password pattern checker program 110A, 110B determined a very strong password has been entered by the user.

Figure 3:
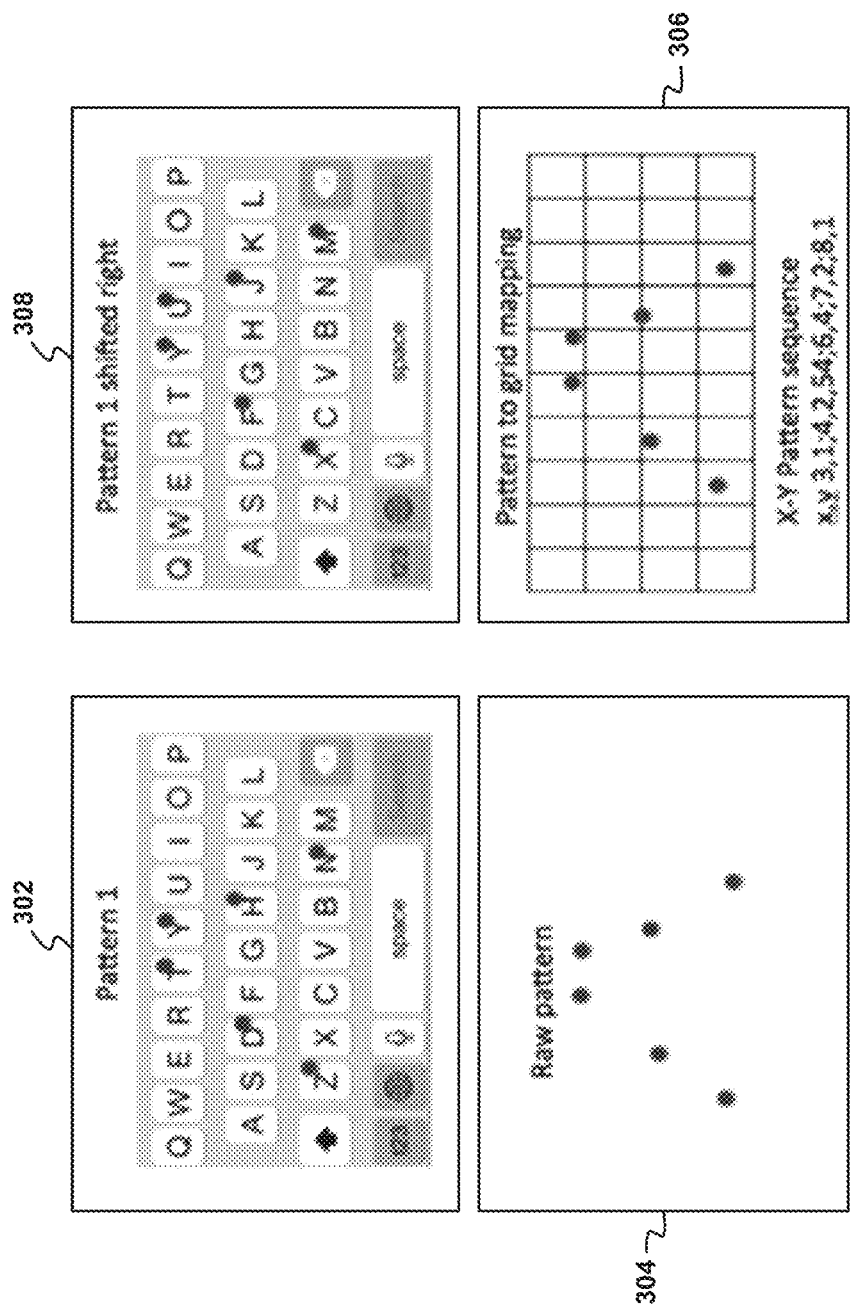
FIG. 3 illustrates an example of checking a password pattern according to at least one embodiment.

Referring now to FIG. 3, an example of checking a password pattern is depicted, according to at least one embodiment. The password pattern checker program 110A, 110B may map the pressed keys from the user-entered password to create pattern 1 image 302. Once the pressed keys are mapped to specific locations on the keyboard, the keyboard image may be removed to review the raw pattern of pressed keys image 304. The password pattern checker program 110A, 110B may then determine coordinate locations. The coordinate locations may be determined by overlaying the raw pattern of pressed keys image 304 over a grid map to create a pattern-to-grid mapping image 306. From the pattern-to-grid mapping image 306, the password pattern checker program 110A, 110B may determine a coordinate sequence, or pattern sequence, of the pressed keys from the password. As previously described, if a key appears more than once on the keyboard, the password pattern checker program 110A, 110B may determine multiple coordinate sequences to accommodate alternate keyboard press patterns. The password pattern checker program 110A, 110B may then utilize known pattern recognition algorithms to determine the strength of the user-entered password. For example, the password pattern checker program 110A, 110B may use the known pattern recognition algorithms to determine the user-enter password that creates pattern 1 image 302 may be the same pattern as a previously-entered user password that has been shifted right one column, such as pattern 1 shifted right image 308.

It may be appreciated that FIGS. 2 and 3 provide only an illustration of one implementation and do not imply any limitations with regard to how different embodiments may be implemented. Many modifications to the depicted environments may be made based on design and implementation requirements.

Figure 4:
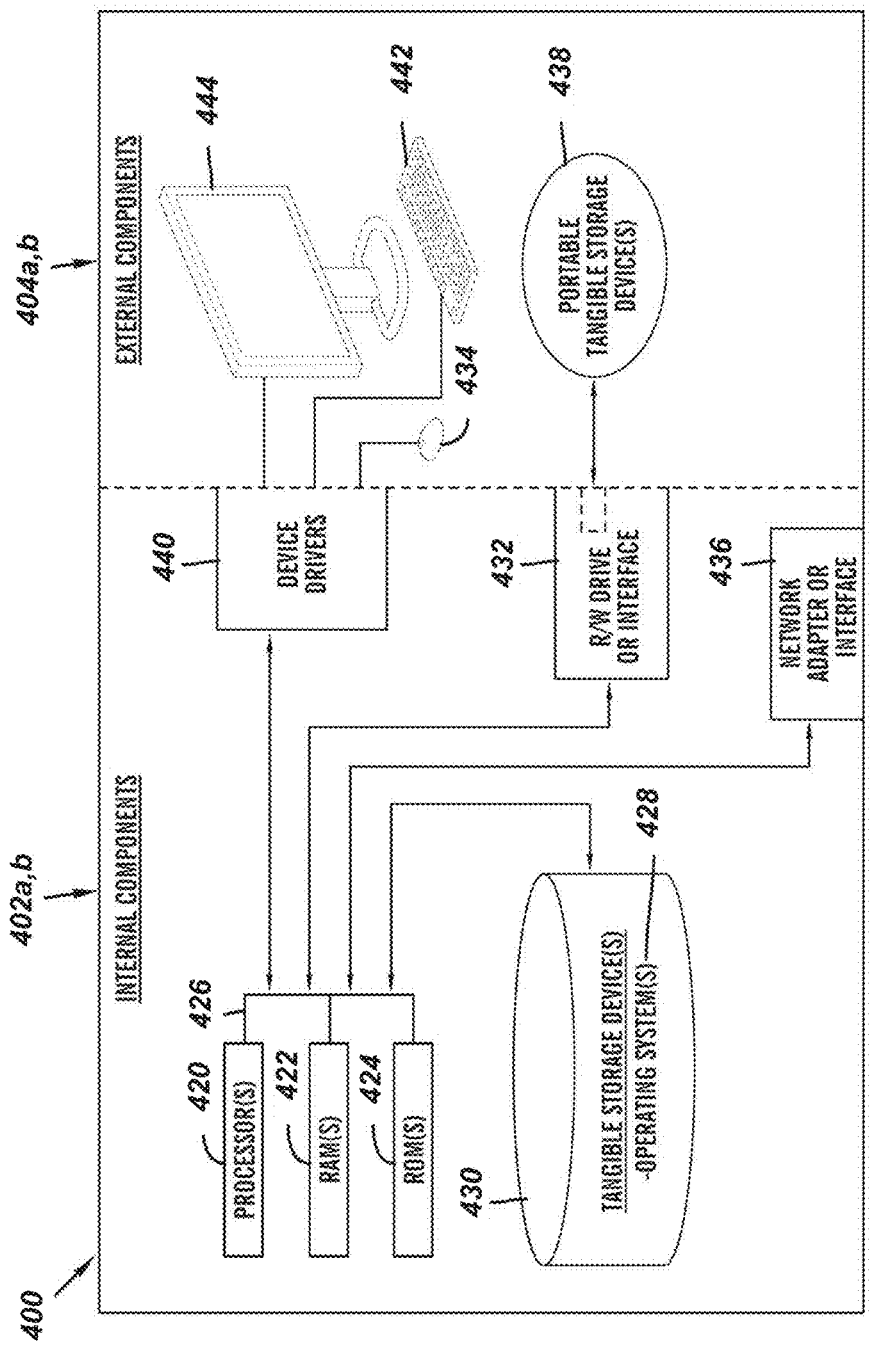
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the password pattern checker program 110A in the client computing device 102, and the password pattern checker program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the password pattern checker program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the password pattern checker program 110A in the client computing device 102 and the password pattern checker program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the password pattern checker program 110A in the client computing device 102 and the password pattern checker program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
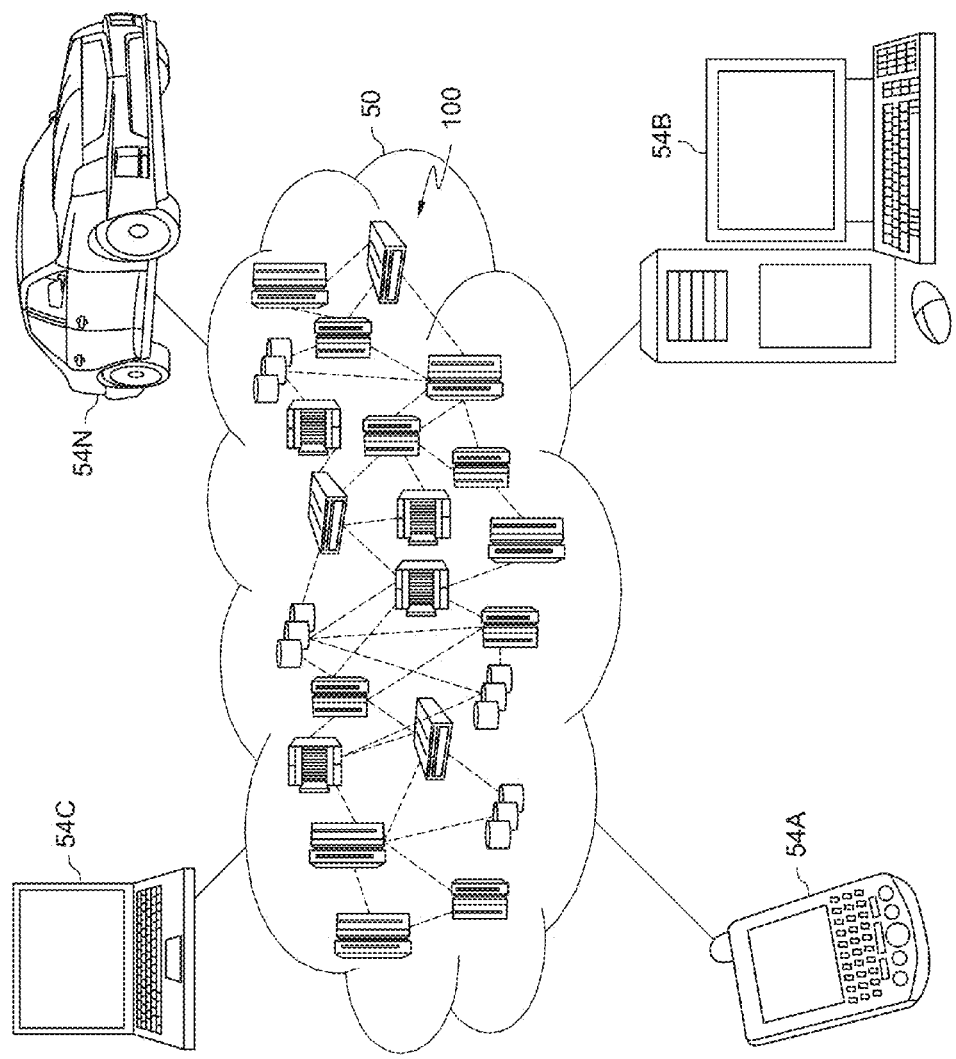
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
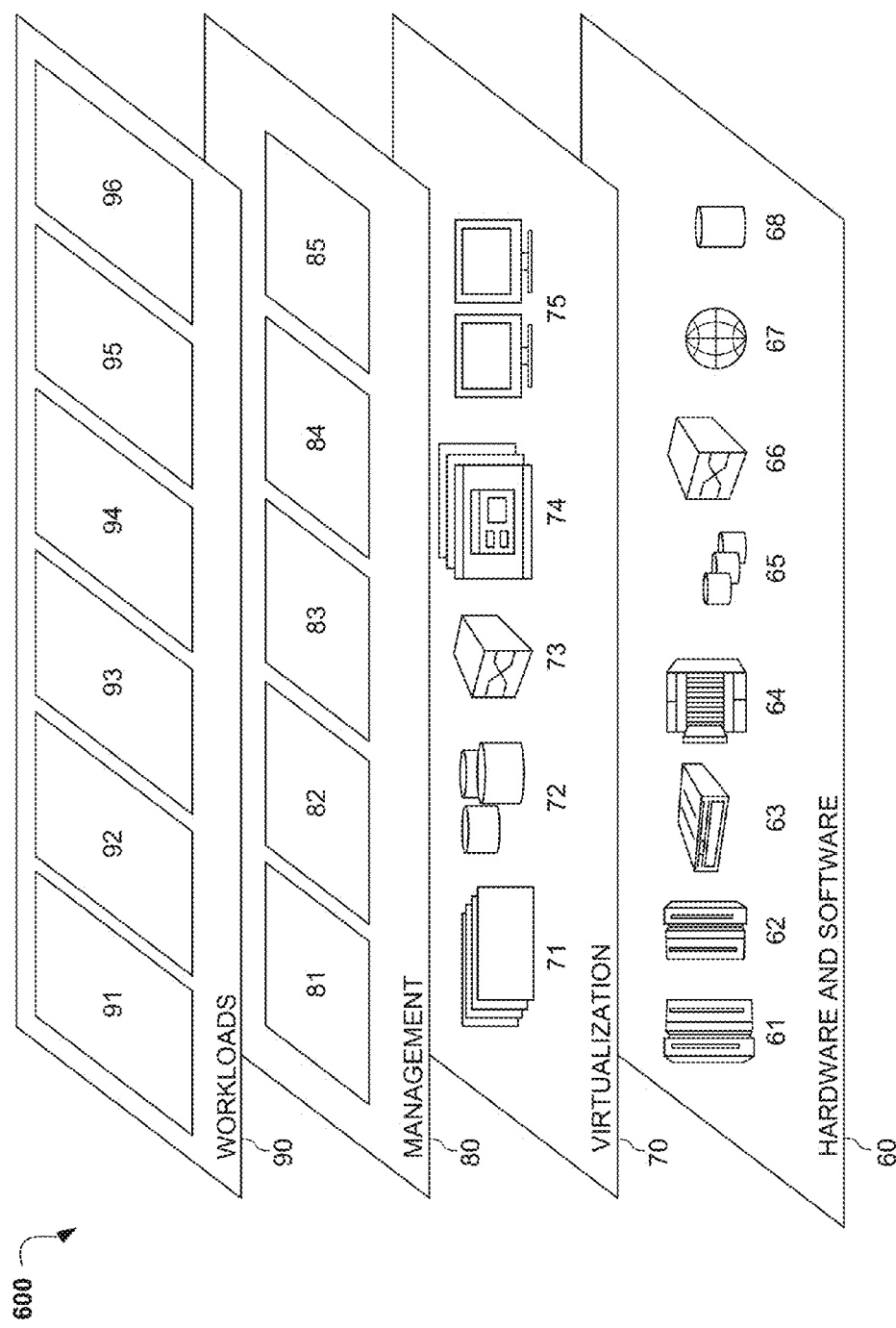
FIG. 6 depicts abstraction model layers according to an embodiment of the present invention.

Referring now to FIG. 6 a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and password pattern checking 96. Password pattern checking 96 may relate to analyzing the key strokes utilized when entering a password to determine if the key strokes form a predictable pattern, thereby compromising password strength.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for determining a password strength, the method comprising:

receiving, by a processor, a user-entered password through a plurality of user interactions with an input device associated with a user device, wherein the plurality of user interactions are selected from a group consisting of a plurality of key presses, a plurality of screen traces, and a plurality of spoken words, and wherein the input device is selected from a group consisting of a physical keyboard, a digital keyboard, and a microphone;

identifying a keyboard layout type associated with a keyboard utilized to enter the received user-entered password;

mapping each character within a plurality of characters in the received user-entered password to a corresponding location on a grid associated with the identified keyboard layout type;

determining a coordinate sequence associated with the received user-entered password based on the mapped plurality of characters, wherein the coordinate sequence is on an x-y coordinate grid and calculated based on a plurality of measurements, and wherein the plurality of measurements is selected from a group consisting of a plurality of inches from a source, a plurality of centimeters from the source, and a plurality of millimeters from the source;

applying a Hough transform pattern recognition algorithm to the determined coordinate sequence, wherein applying the Hough transform pattern recognition algorithm further analyzes a previous password coordinate sequence associated with a user account; and determining a password strength based on the applied Hough transform pattern recognition algorithm and comparing the determined coordinate sequence of the received user-entered password with the analyzed previous password coordinate sequence, wherein the determined password strength is displayed to a user as a word, a number, or a color, and wherein the determined password strength will be weak when the determined coordinate sequence is the same as the analyzed previous password coordinate sequence.

* * * * *